United States Patent [19]

Fudemoto et al.

[11] 3,745,257

[45] July 10, 1973

[54] PCM REGENERATIVE REPEATER

[75] Inventors: Isao Fudemoto, Machida-shi, Tokyo; Shichi Kurita, Kawasaki-shi; Kiyoshi Tomimori, Kawasaki-shi; Tatsuki Hayashi, Kawasaki-shi, all of Japan

[73] Assignee: Fujitsu Limited, Kawasaki, Japan

[22] Filed: May 18, 1971

[21] Appl. No.: 144,489

[30] Foreign Application Priority Data

May 23, 1970 Japan ............................ 45/44352

[52] U.S. Cl. ........... 179/16 E, 179/15 AD, 328/164

[51] Int. Cl. ............................................ H04b 3/36

[58] Field of Search ..................... 179/15 AD, 16 E, 179/16 EA, 170 R, 170 T; 178/70 TS, 70 T, 70 R; 325/6, 13, 38, 42; 328/164; 307/268, 269

[56] References Cited

UNITED STATES PATENTS

| | | | |
|---|---|---|---|
| 2,996,578 | 8/1961 | Andrews, Jr. | 178/70 TS |
| 3,588,715 | 6/1971 | Matsushima | 328/164 |
| 3,544,912 | 12/1970 | Zegers et al. | 328/164 |
| 3,437,760 | 4/1969 | Kawashima et al. | 179/15 AD |
| 3,384,711 | 5/1968 | Boxall | 178/70 R |
| 3,261,986 | 7/1966 | Kawashima et al. | 179/15 AD |
| 3,254,233 | 5/1966 | Kobayashi et al. | 307/268 |
| 2,992,341 | 7/1961 | Andrews et al. | 179/15 AD |
| 2,981,796 | 4/1961 | DeLange | 178/70 R |

*Primary Examiner*—Kathleen H. Claffy
*Assistant Examiner*—Randall P. Myers
*Attorney*—Curt M. Avery, Herbert L. Lerner et al.

[57] ABSTRACT

A control circuit connected between an output of the equalizing amplifier and the input of a full wave rectifier in a regenerative repeater increases the frequency component $f0/2$ of the output signals of the equalizing amplifier. The control circuit comprises a delay line providing a delay equal to the pulse repetition time of the output pulse train from the equalizing amplifier and a subtraction circuit for calculating the difference between the input signals to the delay line and the output signals of the delay line.

5 Claims, 8 Drawing Figures

Patented July 10, 1973 3,745,257

5 Sheets-Sheet 2

Patented July 10, 1973 3,745,257

5 Sheets-Sheet 5

PCM REGENERATIVE REPEATER

DESCRIPTION OF THE INVENTION

The invention relates to a PCM regenerative repeater. More particularly, the invention relates to a timing extracting circuit of a PCM regenerative repeater.

A PCM regenerative repeater is provided in the transmission line of a PCM communication system. The PCM pulses, the time positions of which have been varied and which have been distorted by their passage through the transmission line, may be regenerated by the PCM regenerative repeater into pulses having the correct time positions and having no distortion. In a PCM regenerative repeater, therefore, signals indicating the correct time position, that is, timing signals, are required. The timing signals may be extracted from the received PCM pulses.

An object of the invention is to provide a circuit for extracting the correct timing signals with less noise in a PCM regenerative repeater.

An object of the invention is to provide a timing extracting circuit in a PCM regenerative repeater for providing correct timing signals with little noise by concentrating the spectra of the equalized pulse train around the frequency $f0/2$.

In accordance with the invention, a control circuit is provided in a PCM regenerative repeater for providing timing signals from a pulse train of the difference between a pulse train equalized for the purpose of discrimination and regeneration and a pulse train delayed relative to the equalized pulse train by a time substantially equal to the pulse repetition time of the equalized pulse train. In another embodiment of the control circuit of the invention, the timing signals are derived from a pulse train of the sum of a plurality of pulse trains delayed from the pulse train of the difference by a multiple of a pulse repetition time 2T equal to twice the pulse repetition time T.

In accordance with the invention, a regenerative repeater comprises input means for supplying input pulse waveform trains. An equalizing amplifier having an input connected to input means and first and second outputs equalizes and amplifies input pulse waveforms and produces output signals having a timing pulse repetition frequency $f0$. A control circuit having an input connected to the first output of the equalizing amplifier and an output increases the frequency component $f0/2$. A full wave rectifier having an input connected to the output of the control circuit and an output multiplies the frequency of the output of the control circuit. A tuning circuit having an input connected to the output of the full wave rectifier and an output tunes the output of the full wave rectifier to $f0$. A spike pulse generator having an input connected to the output of the tuning circuit and an output generates timing pulses. A comparator and regenerator having an input connected to the second output of the equalizing amplifier and an output regenerates the waveforms under the control of the timing pulses generated by the spike pulse generator. Output means connected to the output of the comparator and regenerator provides the regenerated waveforms.

In one embodiment of the invention, the control circuit comprises a delay line having an input connected to the input of the control circuit and an output for providing a delay equal to the pulse repetition time of the output pulse train from the equalizing amplifier and a subtraction circuit having an input connected to the input of the control circuit, another input connected to the output of the delay line and an output connected to the output of the control circuit for calculating the difference between the input signals to the delay line and the output signals of the delay line. The subtraction circuit comprises a differential amplifier.

In another embodiment of the invention, the control circuit comprises a first delay line having an input connected to the input of the control circuit and an output for providing a delay equal to the pulse repetition time of the output pulse train from the equalizing amplifier. A first subtraction circuit having an input connected to the input of the control circuit, another input connected to the output of the first delay line and an output calculates the difference between the input signals to the first delay line and the output signals of the first delay line. A second delay line having an input connected to the output of the first delay line and an output provides a delay equal to the pulse repetition time of the output pulse train from the equalizing amplifier. An addition circuit having an input connected to the output of the first subtraction circuit, another input connected to the output of the second delay line and an output adds the output signals of the first subtraction circuit and the output signals of the second delay line. A third delay line having an input connected to the output of the second delay line and an output provides a delay equal to the pulse repetition time of the output pulse train from the equalizing amplifier. A second substraction circuit having an input connected to the output of the addition circuit, another input connected to the output of the third delay line and an output coupled to the output of the control circuit calculates the difference between the output signals of the third delay line and the output signals of the addition circuit.

The control circuit comprises a plurality of delay lines connected in cascade and each providing a delay equal to the pulse repetition time of the output pulse train from the equalizing amplifier. A plurality of subtraction circuits and a plurality of addition circuits are connected in cascade. The subtraction circuits are connected to the odd numbered delay lines and the addition circuits are connected to the even numbered delay lines. Means connect the first of the subtraction circuits and the first of the delay lines in a manner whereby the input signals to the first delay line and the output signals from the first delay line are supplied to the first subtraction circuit. Means connect the subtraction and addition circuits, each of the addition circuits to the corresponding delay lines and each of the subtraction circuits to the corresponding delay lines in a manner whereby the output signals of each of the preceding addition circuits and the output signals of each of the corresponding delay lines are supplied to each of the subtraction circuits and the output signals of each of the preceding subtraction circuits and the output signals of each of the corresponding delay lines are supplied to each of the addition circuits.

In order that the invention may be readily carried into effect, it will now be described with reference to the accompanying drawings, wherein.

Figure 1:
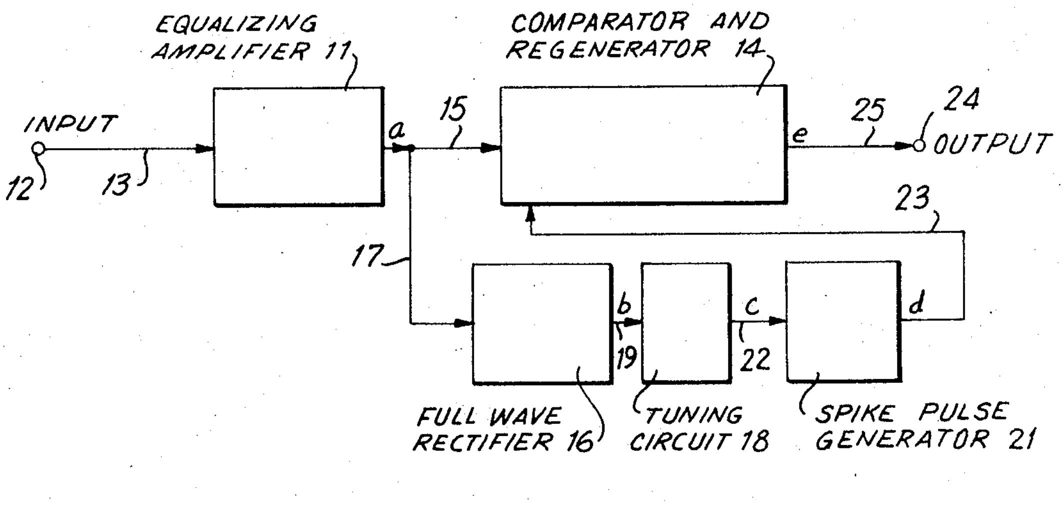
FIG. 1 PRIOR ART
FIG. 1 is a block diagram of a known PCM regenerative repeater.

In FIG. 1, the input signals are supplied to an equalizing amplifier 11 via an input terminal 12 which is connected to the input of the equalizing amplifier via a lead 13. The output of the equalizing amplifier 11 is connected to an input of a comparator and regenerator 14 via a lead 15 and to the input of a full wave rectifier 16 via the lead 15 and a lead 17. The output of the full wave rectifier 16 is connected to the input of a tuning circuit 18 via a lead 19. The output of the tuning circuit 18 is connected to the input of a spike pulse generator 21 via a lead 22. The output of the spike pulse generator 21 is connected to an input of the comparator and regenerator 14 via a lead 23. An output terminal 24 is connected to the output of the comparator and regenerator 14 via a lead 25.

The equalizing amplifier 11 produces an output waveform *a*. The full wave rectifier 16 produces an output waveform *b*. The tuning circuit 18 produces an output waveform *c*. The spike pulse generator 21 produces an output waveform *d*. The comparator and regenerator 14 produces an output waveform *e*. The waveforms *a*, *b*, *c*, *d* and *e* are shown in FIG. 3.

Figure 2:
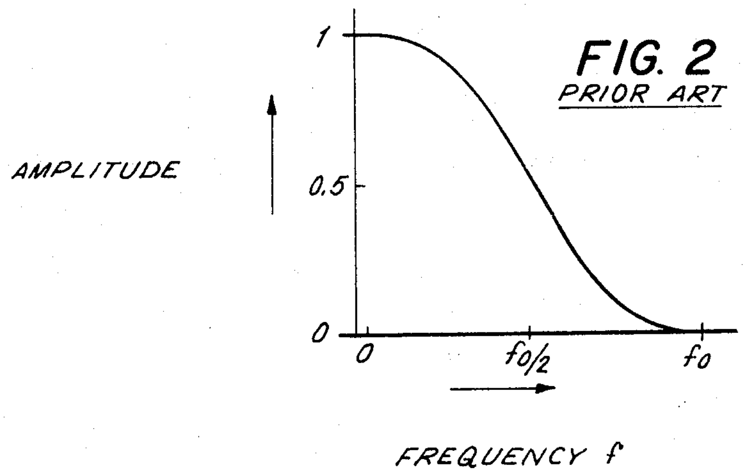
FIG. 2 PRIOR ART
FIG. 2 is a spectrum diagram of the equalized waveform of the input signal of the known PCM regenerative repeater.

The equalizing amplifier 11 produces an input signal spectrum shown in FIG. 2 to reduce the noise and intersymbol interference of the input signals. FIG. 2 shows the output waveform of the equalizing amplifier 11, as does the waveform *a* of FIG. 3. In FIG. 2, the abscissa represents the frequency $f$ and the ordinate represents the amplitude.

Figure 3:
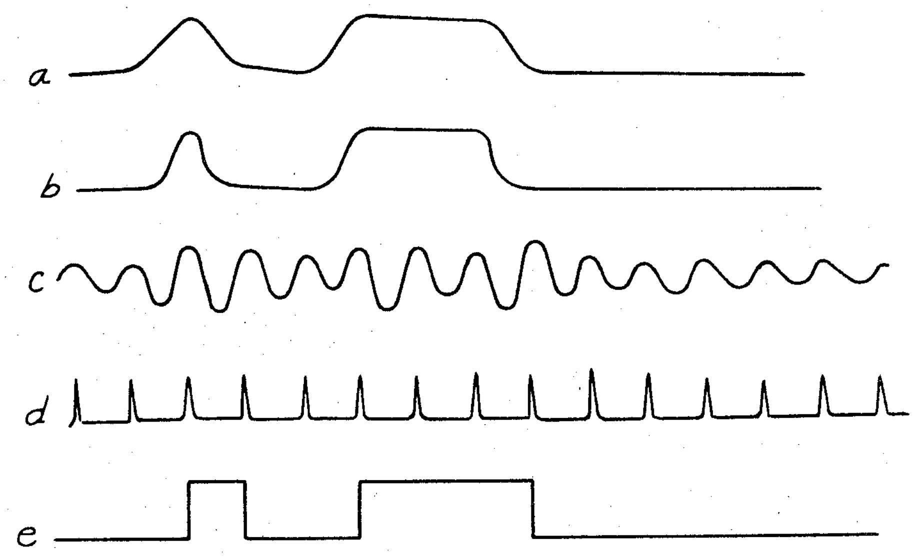
FIG. 3 PRIOR ART
FIG. 3 is a graphical presentation of the waveforms at several different points of the known PCM regenerative repeater.

As shown in FIG. 2 and in the waveform a of FIG. 3, the output waveform of the equalizing amplifier 11 has no component greater than the frequency $f0$. However, in order to provide regenerative repeating, timing signals of the frequency $f0$ must be provided. In the known regenerative repeater, the frequency component $f0/2$ is multiplied by the full wave rectifier 16 (FIG. 1) or a square detector to provide the $f0$ component shown in the waveform *b* of FIG. 3. Only the $f0$ components are extracted by the tuning circuit 18 (FIG. 1) as shown in the waveform *c* of FIG. 3. The spike pulse generator 21 (FIG. 1) provides the timing signals, as shown in the waveform *d* of FIG. 3.

The output waveform *a* of the equalizing amplifier 11 may be regenerated into the correct signals, as shown in the waveform *e* of FIG. 3, in the comparator and regenerator 14 (FIG. 1) by utilizing the timing signals shown in the waveform d of FIG. 3. Thus, in the known regenerative repeater of the aforedescribed type, the $f0/2$ component is multiplied to provide the timing signal.

When the equalized waveforms have no $f0$ component, correct timing waves having little noise may be provided by concentrating the spectra of the equalized pulse train around $f0/2$ and enlarging the $f0/2$ component. In the timing extracting circuit of the invention, the spectra of the equalized pulse train are concentrated around $f0/2$ to provide the correct timing signals with little noise.

Figure 4:
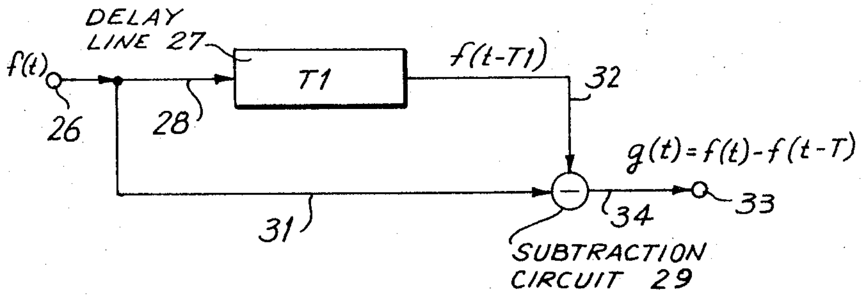
FIG. 4 PRIOR ART
FIG. 4 is a block diagram of an embodiment of the timing extracting circuit of the invention.
Figure 7:
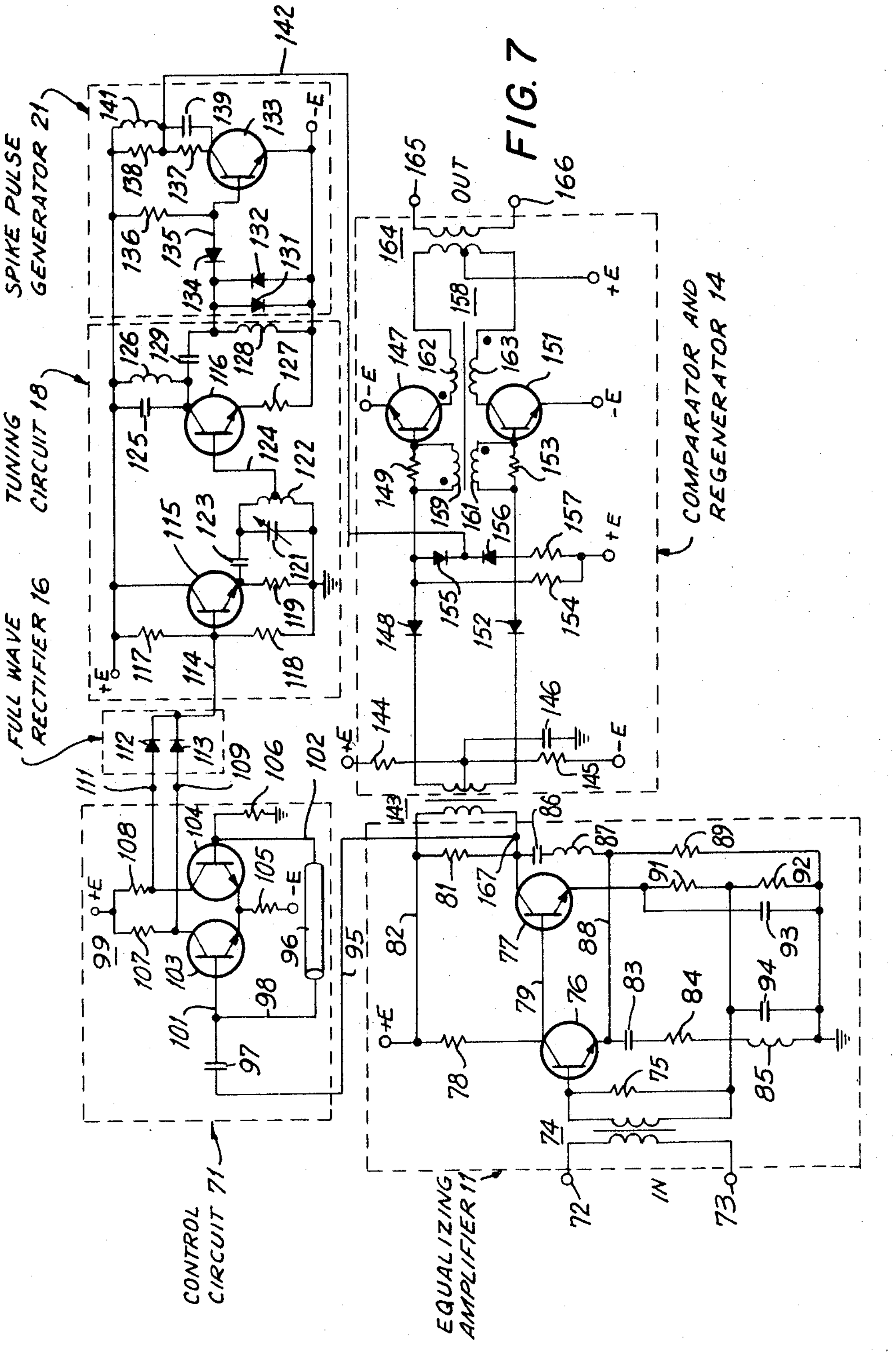
FIG. 7 is a circuit diagram of a PCM regenerative repeater embodying the timing extracting circuit of FIG. 4.

In the timing extracting circuit of the invention shown in FIG. 4, the spectra of the equalized pulse train are concentrated around $f0/2$. In accordance with the invention, the timing extracting circuit of FIG. 4 is connected between the output of the equalizing amplifier 11 and the input of the full wave rectifier 16 in the PCM regenerative repeater of FIG. 1. The complete PCM regenerative repeater, including the timing extracting circuit of the invention, as shown in FIG. 4, is shown in FIG. 7.

In FIG. 4, signals from the equalizing amplifier 11 (FIG. 1) are supplied to an input terminal 26. The input terminal 26 is connected to the input of a delay line 27 via a lead 28 and to an input of a subtraction circuit 29 via the lead 28 and a lead 31. The output of the delay line 27 is connected to another input of the subtraction circuit 29 via a lead 32. An output terminal 33 is connected to the output of the subtraction circuit 29 via a lead 34.

The delay line 27 provides a delay of T1. The equalized pulse train $f(t)$ is supplied to the input terminal 26, and the delay line 27 delays said equalized pulse train $f(t)$ by T1, so that said delay line provides an output $f(t-\text{T1})$. The subtraction circuit 29 thus provides the difference between the equalized pulse train $f(t)$ and the T1 delayed equalized pulse train $f(t-\text{T1})$ and provides a conversion of the spectrum of the equalized pulse train of the difference.

If it is assumed that T1 is selected as equal to the repetition period $T$ of the equalized pulse train $f(t)$, the output pulse train of the subtraction circuit 29 of FIG. 4 may be expressed as $$g(t) = f(t) - f(t-T)$$

By the Laplace transformation of the equation, the spectrum of the output pulse train may be expressed as $$g(\omega) = 2f(\omega) \sin \omega T/2$$

Since $\omega$ equals $2\pi f$ and $T$ equals $1/f0$, $g(\omega)$ may be rewritten as $g(\omega) = 2f(\omega) \sin \pi f/f0$ Thus, $g(\omega)$ becomes a maximum when $\pi f/f0$ equals $\pi/2$, and at such time $f$ equals $f0/2$.

Figure 6:
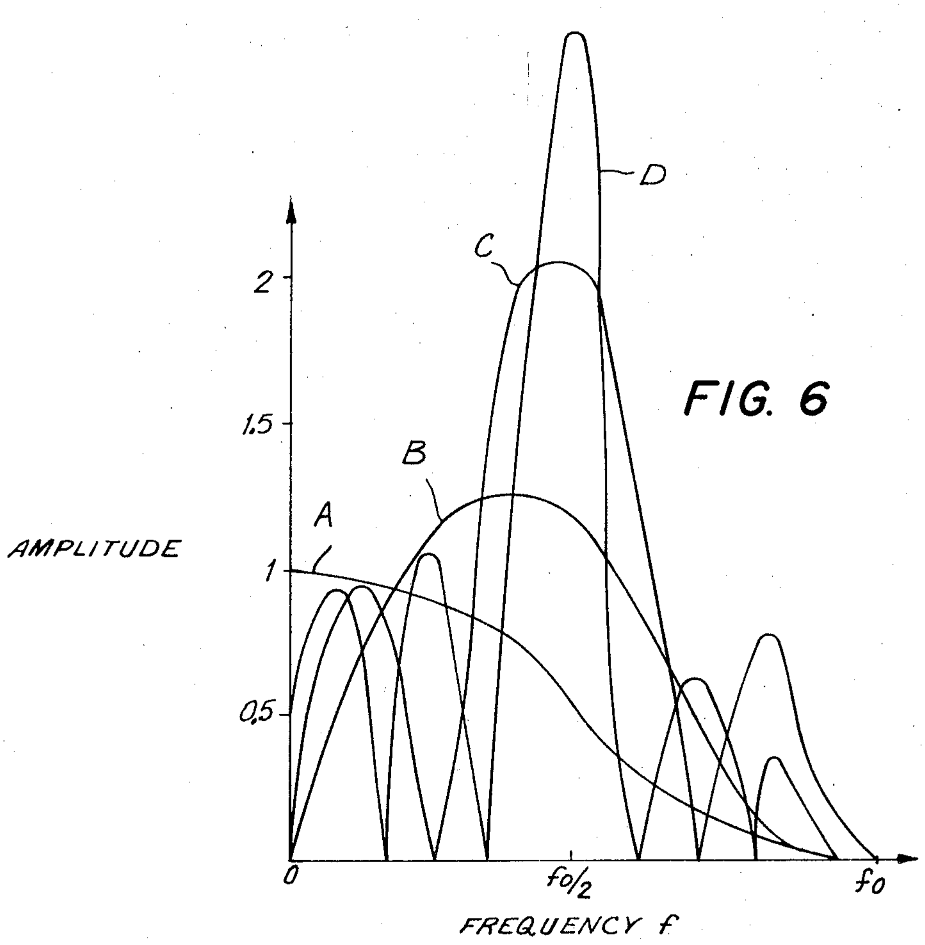
FIG. 6 is a graphical presentation for explaining the operation of the timing extracting circuit of the invention.

The spectrum B of FIG. 6, wherein the abscissa represents the frequency $f$, and the ordinate represents the amplitude, thus illustrates $g(\omega)$. The spectrum B of FIG. 6 reaches a maximum when $f$ equals $f0/2$. The spectrum A of FIG. 6 is the unconverted spectrum of the equalized pulse train (FIG. 2). Thus, in accordance with our invention, the $f0/2$ component may be increased by passing the equalized pulse train through the timing extracting circuit of the invention, as shown in FIG. 4.

Figure 5:
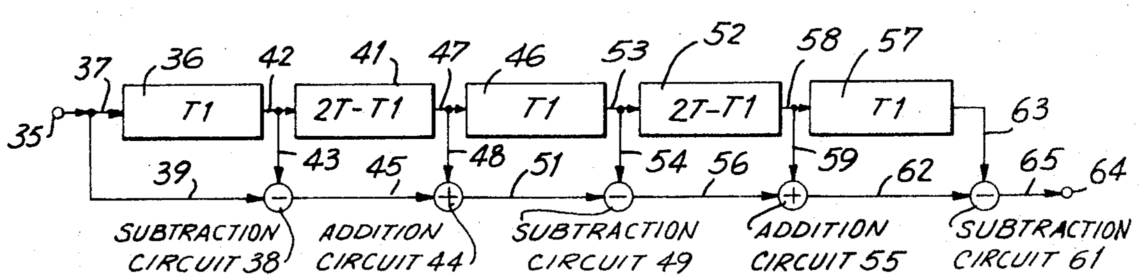
FIG. 5 is a block diagram of another embodiment of the timing extracting circuit of the invention.
Figure 8:
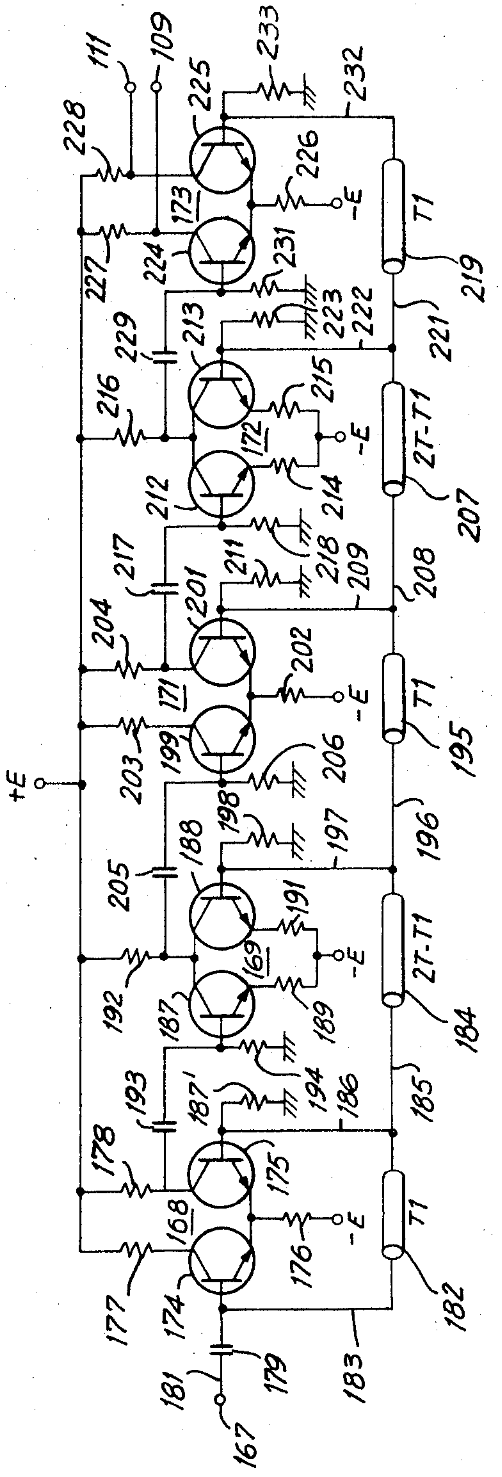
FIG. 8 is a circuit diagram of the timing extracting circuit of FIG. 5.

Another embodiment of the timing extracting circuit of the invention is shown in FIG. 5. The timing extracting circuit of FIG. 5 is connected between the output of the equalizing amplifier 11 and the input of the full wave rectifier 16 of FIG. 1. A circuit diagram of the timing extracting circuit of FIG. 5 is shown in FIG. 8.

In FIG. 5, an input terminal 35 is connected to the input of a first delay line 36 via a lead 37 and to an input of a first subtraction circuit 38 via the lead 37 and a lead 39. The output of the first delay line 36 is connected to the input of a second delay line 41 via a lead 42 and to another input of the subtraction circuit 38 via the lead 42 and a lead 43. The output of the subtraction circuit 38 is connected to an input of a first addition circuit 44 via a lead 45. The output of the second delay line 41 is connected to the input of a third delay line 46 via a lead 47 and to another input of the addition circuit 44 via the lead 47 and a lead 48.

The output of the addition circuit 44 is connected to an input of a second subtraction circuit 49 via a lead 51. The output of the third delay line 46 is connected to the input of a fourth delay line 52 via a lead 53 and to another input of the subtraction circuit 49 via the lead 53 and a lead 54. The output of the subtraction circuit 49 is connected to an input of a second addition circuit 55 via a lead 56. The output of the fourth delay line 52 is connected to the input of a fifth delay line 57 via a lead 58 and to another input of the addition circuit 55 via the lead 58 and a lead 59. The output of the addition circuit 55 is connected to an input of a third subtraction circuit 61 via a lead 62. The output of the fifth delay line 57 is connected to another input of the subtraction circuit 61 via a lead 53. An output terminal 64 is connected to the output of the third subtraction circuit 61 via a lead 65.

Each of the first, third and fifth delay lines 36, 46 and 57, respectively, has a delay of T1. Each of the second and fourth delay lines 41 and 52, respectively, has a delay of 2T–T1. The circuit of FIG. 5 may be provided by interconnecting a plurality of circuits of FIG. 4 with a time interval of 2T.

The utilization of the circuit of FIG. 5 permits a closer concentration of the spectra to $f0/2$, as shown by the curves C and D of FIG. 6. This is due to the fact that when the output of the circuit of FIG. 4 is expressed as $g(t)$, a pulse train delayed by a time $2T$ from the output $g(t)$ may be expressed as $g(t-2T)$. The output pulse train $s(t)$ of a circuit comprising two circuits of FIG. 4 may be expressed as $$s(t) = g(t)+g(t-2T)$$

The Laplace transformation of this equation provides a spectrum expression $$s(\omega) = 2g(\omega) \cos 2\omega T$$
$$= 2g(\omega) \cos 4\pi f/f0$$

$s(\omega)$ is a maximum when $4\pi f/f0$ equals $2\pi$, and at such time $f$ equals $f0/2$. The spectrum C of FIG. 6 thus illustrates $s(\omega)$.

The greater the number of interconnected circuits of FIG. 4, the more closely the output pulse train is concentrated on $f0/2$. The curve D of FIG. 6 is the spectrum of a circuit of FIG. 5 which includes three circuits of FIG. 4.

The $f0$ component may be increased by converting the equalized pulse train in the aforedescribed manner and then providing square detection. Thus, for example, the timing component extracted from a random equalized pulse train utilizing the circuit of FIG. 1, in which the converter or timing extracting circuit of FIG. 4 is connected between the output of the equalizing amplifier 11 and the input of the full wave rectifier 16, is equal to about 1.5 times the timing component derived from the same pulse train utilizing the unmodified circuit of FIG. 1.

FIG. 7 is a circuit diagram of the PCM regenerative repeater of the invention. In FIG. 7, the equalizing amplifier 11, the full wave rectifier 16, the tuning circuit 18, the spike pulse generator 21 and the comparator and regenerator 14 are the same as in the known PCM regenerative repeater of FIG. 1. The distinction between the known regenerative repeater and that of the invention is the inclusion of a control circuit 71 between the output of the equalizing amplifier 11 and the input of the full wave rectifier 16. The control circuit 71 comprises the circuit of FIG. 4 or FIG. 5.

In FIG. 7, the input pulse waveforms are supplied to the input of the equalizing amplifier 11 via input terminals 72 and 73. The equalizing amplifier 11 equalizes the waveforms of the input pulses so that they have the spectrum shown in FIG. 2. The equalizing amplifier 11 comprises an input transformer 74 having a matching resistor 75 connected in shunt with a secondary winding thereof. A pair of amplifying transistors 76 and 77 are provided. The base electrode of the amplifying transistor 76 is connected to one end of the secondary winding of the input transformer 74. The collector electrode of the transistor 76 is connected to a positive bias voltage supply source +E via a collector resistor 78, and is connected to the base electrode of the second amplifying transistor 77 via a lead 79. The collector electrode of the transistor 77 is connected to the bias voltage source +E via a resistor 81 and a lead 82. The resistors 78 and 81 control the gain of the amplifier.

In the equalizing amplifier 11, the emitter electrode of the transistor 76 is connected to a point at ground potential via the series circuit arrangement of a capacitor 83, a resistor 84 and an inductor 85. A capacitor 86 and an inductor 87 are connected in series circuit arrangement between the collector electrode of the transistor 77 and the emitter electrode of the transistor 76 via a lead 88. A resistor 89 is connected in series between the series circuit arrangement 86, 87 and a point at ground potential. The emitter electrode of the transistor 77 is connected to a point at ground potential via a pair of resistors 91 and 92 in series circuit arrangement and a capacitor 93 connected in shunt across the resistors 91 and 92. A capacitor 94 is connected across the resistor 92 between the other end of the secondary winding of the input transformer 74 and the point at ground potential. The capacitors 93 and 94 are bypass capacitors and the resistors 89, 91 and 92 are DC bias resistors. The capacitors 83 and 86, the resistor 84 and the inductors 85 and 87 control the equalizing characteristic and the gain of the equalizing amplifier.

The pulses equalized by the equalizing amplifier 11 are supplied to the control circuit 71 of the invention via a lead 95 connected to the collector electrode of the transistor 77 of said equalizing amplifier. The lead 95 is connected to the input of a delay line 96 of the control circuit 71 via a coupling capacitor 97 and a lead 98 and to an input of a subtraction circuit 99 via said capacitor and a lead 101. The delay of the delay line 96 is $T1$, and the control circuit 71 is the same as the circuit of FIG. 4. The output of the delay line 96 is connected to another input of the subtraction circuit 99 via a lead 102.

The subtraction circuit 99 of the control circuit 71 of FIG. 7 comprises a differential amplifier having two transistors 103 and 104. The emitter electrodes of the transistor 103 and 104 are connected in common to a negative bias voltage supply source −E via a resistor 105. The lead 101 is connected to the base electrode of the transistor 103. The lead 102 is connected to the base electrode of the transistor 104. The base electrode of the transistor 104 is connected to a point at ground potential via a resistor 106. The collector electrodes of the transistors 103 and 104 are connected in common, via collector resistors 107 and 108, to the positive bias voltage source +E. An output terminal is connected to the collector electrode of the transistor 103 and an output terminal 111 is connected to the collector electrode of the transistor 104. The pulses of the difference between the input pulses and the pulses provided by passing the input pulses through the delay line 96 are provided at the output terminals 109 and 111 of the control circuit 71.

The output terminals 109 and 111 of the control circuit 71 are connected as the input terminals of the full wave rectifier 16. The full wave rectifier 16 comprises a pair of diodes 112 and 113, having their cathodes connected in common to the input of the tuning circuit 18 via a lead 114. The anode of the diode 112 is connected to the terminal 111 and the anode of the diode 113 is connected to the terminal 109.

The tuning circuit 18 extracts or derives the frequency component *f*0. The tuning circuit 18 comprises a transistor 115 and a transistor 116. The transistor 115 and its cooperating components function as a tuning circuit, and the transistor 116 and its cooperating components function as an amplifying circuit. The base electrode of the transistor 115 is connected to the lead 114, to the positive bias voltage source +E via a lead 117, and to a point at ground potential via a resistor 118. The collector electrode of the transistor 115 is directly connected to the positive bias voltage source +E. The emitter electrode of the transistor 115 is connected to a point at ground potential via a resistor 119.

A tuning circuit is connected in shunt with the emitter electrode of the transistor 115 and comprises a variable capacitor 121 connected in parallel with said resistor, a variable inductor 122 connected in parallel with said resistor and a capacitor 123 connected between the emitter electrode of the transistor 115 and the parallel circuit 121, 122.

The base electrode of the transistor 116 is connected to an output tap on the inductor 122 via a lead 124. The collector electrode of the transistor 116 is connected to the positive bias voltage source +E via a capacitor 125 and an inductor 126 connected in shunt with said capacitor. The emitter electrode of the transistor 116 is connected to the negative bias voltage source −E via a resistor 127. An inductor 128 has one end connected to the negative bias voltage source −E and its other end connected to the collector electrode of the transistor 116 via a capacitor 129.

The frequency component *f*0 provided by the tuning circuit 18 is supplied to the spike pulse generator 21 via the capacitor 129. The capacitor 129 cuts off the direct current. The spike pulse generator 21 comprises a pair of limiting diodes 131 and 132 connected in shunt with the indicator 128. The cathode of the diode 131 and the anode of the diode 132 are connected to the negative bias voltage source −E. The anode of the diode 131 and the cathode of the diode 132 are coupled to the base electrode of a transistor 133 via a diode 134 and a lead 135.

The emitter electrode of the transistor 133 is directly connected to the negative bias voltage source −E. The base electrode of the transistor 133 is connected to the positive bias voltage source +E via a resistor 136. The collector electrode of the transistor 133 is connected to the positive bias voltage source +E via the series circuit connection of a pair of resistors 137 and 138 and a capacitor 139 and an inductor 141 connected in shunt with said resistors. The resistor 137 and the capacitor 139 are connected in parallel with each other and the resistor 138 and the inductor 141 are connected in parallel with each other. This circuit functions as a differential amplifier for producing the spike pulses.

The output spike pulses produced by the spike pulse generator 21 are supplied to the comparator and regenerator 14, via a lead 142, as timing pulses. The output of the equalizing amplifier 11 is also supplied to the comparator and regenerator 14 via a coupling transformer 143, the primary winding of which is connected in shunt with the resistor 81 of said equalizing amplifier. The secondary winding of the coupling transformer 143 has an output tap which is connected to the positive bias voltage source +E via a resistor 144, to the negative bias voltage source −E via a resistor 145 and to a point at ground potential via a capacitor 146. One end of the secondary winding of the coupling transformer 143 is coupled to the base electrode of a transistor 147 via the series circuit arrangement of a diode 148 and a resistor 149. The other end of the secondary winding of the coupling transformer 143 is connected to the base electrode of a transistor 151 via the series circuit arrangement of a diode 152 and a resistor 153.

A common point in the connection between the diode 148 and the resistor 149 is connected to the positive bias voltage source +E via a resistor 154 and is also connected to said positive bias voltage source via the series circuit arrangement of a diode 155, a diode 156 and a resistor 157 connected in shunt with said resistor 154. The anode of the diode 155 is connected to the anode of the diode 148. The anode of the diode 156 is connected to the resistor 157. The cathodes of the diodes 155 and 156 are connected in common to the lead 142 from the spike pulse generator 21.

A transformer 158 has a winding 159 connected in shunt with the resistor 149, a winding 161 connected in shunt with the resistor 153, a winding 162 having one end connected to the collector electrode of the transistor 147 and a winding 163 having one end connected to the collector electrode of the transistor 151. The emitter electrode of the transistor 147 and the emitter electrode of the transistor 151 are each connected to the negative bias voltage source −E. The other end of the winding 162 of the transformer 158 is connected to one end of the primary winding of a transformer 164. The other end of the winding 163 of the transformer 158 is connected to the other end of the primary winding of the transformer 164. The primary winding of the transformer 164 has an output tap connected to the positive bias voltage source +E. An output terminal 165 is connected to one end of the secondary winding of the transformer 164 and an output terminal 166 is connected to the other end of said secondary winding.

The resistors 144 and 145 are bias resistors and the capacitor 146 is a bypass capacitor. The comparator and regenerator 14 determines whether the output of the equalizing amplifier 11 is 1 or 0, when a binary system is utilized. The components 154, 157, 155 and 156 function as a gate controlled by the timing pulses produced by the spike pulse generator 21. The components 147, 151, 149, 153 and 158 function as a blocking oscillator. The output pulses of the blocking oscillator, with the corrected waveforms and time positions, are provided at the output terminals 165 and 166 of the output transformer 164.

FIG. 8 is a circuit diagram of the embodiment of FIG. 5 and may be connected between the terminals 167 and the terminals 109 and 111 of the PCM regenerative repeater of FIG. 7, thereby replacing the control circuit 71. The circuit of FIG. 8 comprises a plurality of differential amplifiers 168, 169, 171, 172 and 173. The first differential amplifier 168 comprises a pair of transistors 174 and 175 having a common emitter connection which is connected to the negative bias voltage source −E via a resistor 176. The collector electrode of the transistor 174 is connected to the positive bias voltage source +E via a load resistor 177. The collector electrode of the transistor 175 is connected to the positive bias voltage source +E via a load resistor 178. The input terminal 167 is connected to the base electrode of the transistor 174 via a coupling capacitor 179 and a lead 181 and to the input of a first delay line 182 via the lead 181 and a lead 183. The output of the first delay line 182 is connected to the input of a second delay line 184 via a lead 185 and to the base electrode of the transistor 175 via the lead 185 and a lead 186. The base electrode of the transistor 175 is connected to a point at ground potential via a bias resistor 187'.

The second differential amplifier comprises a pair of transistors 187 and 188. The emitter electrode of the transistor 187 is connected to the negative bias voltage source −E via a resistor 189 and the emitter electrode of the transistor 188 is connected to said negative bias voltage source via a resistor 191. The transistors 187 and 188 have a common collector connection connected to the positive bias voltage source +E via a resistor 192. The first differential amplifier is connected to the second differential amplifier via a coupling capacitor 193 connected between the collector electrode of the transistor 175 and the base electrode of the transistor 187. The base electrode of the transistor 187 is connected to a point at ground potential via a resistor 194. The output of the second delay line 184 is connected to the input of a third delay line 195 via a lead 196 and is connected to the base electrode of the transistor 188 via the lead 196 and a lead 197. The base electrode of the transistor 188 is connected to a point at ground potential via a resistor 198.

The third differential amplifier comprises a pair of transistors 199 and 201 having a common emitter connection to the negative bias voltage source −E via a resistor 202. The collector electrode of the transistor 199 is connected to the positive bias voltage source +E via a resistor 203 and the collector electrode of the transistor 201 is connected to said positive bias voltage source via a resistor 204. The second differential amplifier 169 is connected to the third differential amplifier 171 via a coupling capacitor 205 connected between the common collector connection of said second differential amplifier and the base electrode of the transistor 199. The base electrode of the transistor 199 is connected to a point at ground potential via a resistor 206. The output of the third delay line 195 is connected to the input of a fourth delay line 207 via a lead 208 and is connected to the base electrode of the transistor 201 via the lead 208 and a lead 209. The base electrode of the transistor 201 is connected to a point at ground potential via a resistor 211.

The fourth differential amplifier comprises a pair of transistors 212 and 213. The emitter electrode of the transistor 212 is connected to the negative bias voltage source −E via a resistor 214 and the emitter electrode of the transistor 213 is connected to said negative bias voltage source via a resistor 215. The transistors 212 and 213 are connected in common collector connection to the positive bias voltage source +E via a resistor 216. The third differential amplifier 171 is connected to the fourth differential amplifier 172 via a coupling capacitor 217 connected between the collector electrode of the transistor 201 and the base electrode of the transistor 212. The base electrode of the transistor 212 is connected to a point at ground potential via a bias resistor 218. The output of the fourth delay line 207 is connected to the input of a fifth delay line 219 via a lead 221 and to the base electrode of the transistor 213 via the lead 221 and a lead 222. The base electrode of the transistor 213 is connected to a point at ground potential via a bias resistor 223.

The fifth differential amplifier 173 comprises a pair of transistors 224 and 225 having a common emitter connection to the negative bias voltage source −E via a resistor 226. The collector electrode of the transistor 224 is connected to a positive bias voltage source +E via a resistor 227 and the collector electrode of the transistor 225 is connected to said positive bias voltage source via a resistor 228. The fourth differential amplifier 172 is connected to the fifth differential amplifier 173 via a coupling capacitor 229 connected between the common collector connection of said fourth differential amplifier and the base electrode of the transistor 224. The base electrode of the transistor 224 is connected to a point at ground potential via a bias resistor 231. The output of the fifth delay line 219 is connected to the base electrode of the transistor 225 via a lead 232. The base electrode of the transistor 225 is connected to a point at ground potential via a bias resistor 233. The output terminal 109 is connected to the collector electrode of the transistor 224. The output terminal 111 is connected to the collector electrode of the transistor 225.

The first, third and fifth differential amplifiers 168, 171 and 173 function as subtraction circuits, whereas the second and fourth differential amplifiers 169 and 172 function as addition circuits. Each of the first, third and fifth delay lines 182, 195 and 219 provides a delay of T1. Each of the second and fourth delay lines 184 and 207 provides a delay of 2T−T1. Actually, each of the five delay lines provides the same delay time, since T1 equals *T*.

While the invention has been described by means of specific examples and in specific embodiments, we do not wish to be limited thereto, for obvious modifications will occur to those skilled in the art without departing from the spirit and scope of the invention.

We claim:

1. A regenerative repeater comprising input means for supplying input pulse waveform trains; an equalizing amplifier having an input connected to said input means and first and second outputs for equalizing and amplifying input pulse waveforms and producing output signals having a timing pulse repetition frequency *f*0; a control circuit for increasing the frequency component *f*0/2, said control circuit having an input connected to the first output of the equalizing amplifier and an output; a full wave rectifier having an input connected to the output of the control circuit and an output for multiplying the frequency of the output of the control circuit; a tuning circuit having an input connected to the output of the full wave rectifier and an output for tuning the output of the full wave rectifier to *f*0; a spike pulse generator having an input connected to the output of the tuning circuit and an output for generating timing pulses; comparator and regenerator means having an input connected to the second output of the equalizing amplifier and an output for regenerating the waveforms under the control of the timing pulses generated by the spike pulse generator; and output means connected to the output of the comparator and regenerator for providing the regenerated waveforms.

2. A regenerative repeater as claimed in claim 1, wherein the control circuit comprises a delay line having an input connected to the input of the control circuit and an output for providing a delay equal to the pulse repetition time of the output pulse train from the equalizing amplifier and a subtraction circuit having an input connected to the input of the control circuit, another input connected to the output of the delay line and an output connected to the output of the control circuit for calculating the difference between the input signals to the delay line and the output signals of the delay line.

3. A regenerative repeater as claimed in claim 1, wherein the control circuit comprises a first delay line having an input connected to the input of the control circuit and an output for providing a delay equal to the pulse repetition time of the output pulse train from the equalizing amplifier, a first subtraction circuit having an input connected to the input of the control circuit, another input connected to the output of the first delay line and an output for calculating the difference between the input signals to the first delay line and the output signals of the first delay line, a second delay line having an input connected to the output of the first delay line and an output for providing a delay equal to the pulse repetition time of the output pulse train from the equalizing amplifier, an addition circuit having an input connected to the output of the first subtraction circuit, another input connected to the output of the second delay line and an output for adding the output signals of the first subtraction circuit and the output signals of the second delay line, a third delay line having an input connected to the output of the second delay line and an output for providing a delay equal to the pulse repetition time of the output pulse train from the equalizing amplifier, and a second subtraction circuit having an input connected to the output of the addition circuit, another input connected to the output of the third delay line and an output coupled to the output of the control circuit for calculating the difference between the output signals of the third delay line and output signals of the addition circuit.

4. A regenerative repeater as claimed in claim 1, wherein the control circuit comprises a plurality of delay lines connected in cascade and each providing a delay equal to the pulse repetition time of the output pulse train from the equalizing amplifier, a plurality of subtraction circuits and a plurality of addition circuits connected in cascade, the subtraction circuits being connected to the odd numbered delay lines and the addition circuits being connected to the even numbered delay lines, means connecting the first of the subtraction circuits and the first of the delay lines in a manner whereby the input signals to the first delay line and the output signals from the first delay line are supplied to the first subtraction circuit, means connecting the subtraction and addition circuits, each of the addition circuits connected to the corresponding delay line and each of the output of a subtraction circuits connected to the output of a corresponding delay line in a manner whereby the output signals of each of the preceding addition circuits and the output signals of each of the corresponding delay lines are supplied to each of the subtraction circuits and the output signals of each of the preceding subtraction circuits and the output signals of each of the corresponding delay lines are supplied to each of the addition circuits.

5. A regenerative repeater as claimed in claim 2, wherein the subtraction circuit comprises a differential amplifier.

* * * * *